A. Alden,

Broom Head,

Nº 76,688.   Patented Apr. 14, 1868.

Witnesses:
J. A. Service
Theo Tusche

Inventor:
A. Alden

Per Munn & Co
Attorneys.

United States Patent Office.

ALBERT ALDEN, OF EAST CAMBRIDGE, MASSACHUSETTS.

Letters Patent No. 76,688, dated April 14, 1868.

IMPROVED BROOM-HEAD.

*The Schedule referred to in these Letters Patent and making part of the same.*

TO ALL WHOM IT MAY CONCERN:

Be it known that I, ALBERT ALDEN, of East Cambridge, in the county of Middlesex, and State of Massachusetts, have invented a new and improved Broom-Head; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a broom-head which is particularly adapted to rattan and other brooms made of long, fibrous, and coarse material, but which may also be used with advantage in the construction of brush or broom-corn brooms.

The invention consists in the manner of securing the corn to the head, and in the construction and arrangement of the different parts which constitute the heads. The stub ends of the broom-corn or brush are laid over a wooden or other bar, so as to be held between the same and the cross-bar of the broom-head to which the handle is secured. The said bar is secured to the cross-head by means of screw-bolts, and the sides of the corn are confined between side springs or leather or elastic bands. The two halves of the broom on both sides of the aforesaid bar are connected by a thread, wire, or cord, which is passed through holes or slots in the bar. A very good fastening for the corn is thus effected, and when the latter is destroyed or used up, it can be easily renewed without the assistance of experts.

A represents the handle of the broom, to the lower end of which a cross-head, B, is secured in any suitable manner. The under side of this cross-head is almost or perfectly flat.

Figure 1:
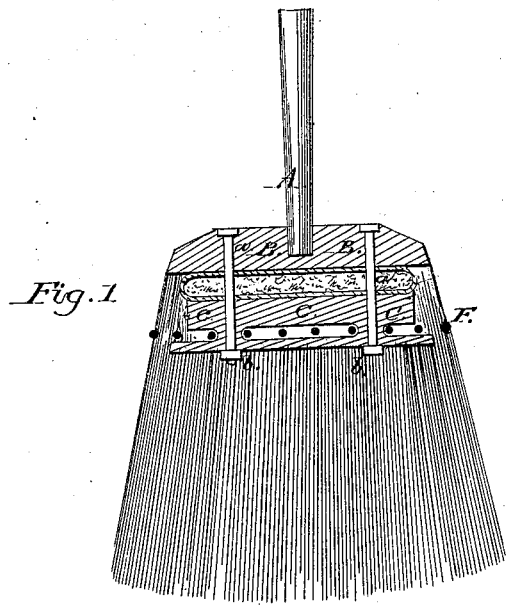
Figure 1 represents a central longitudinal section of my improved broom-head.
Figure 2:
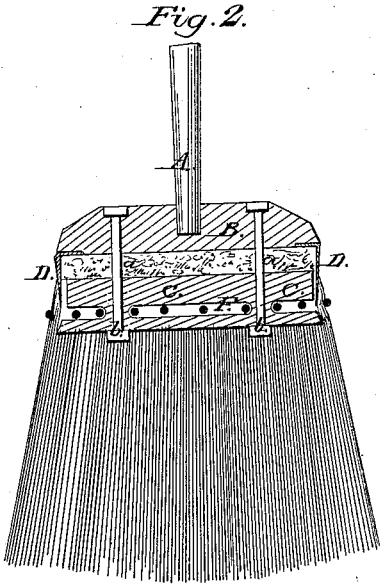
Figure 2 is a similar view of a modification of the same.

C is a bar, having a flat upper surface. The ends of the corn are laid around the bar C, and the latter is then secured to the cross-head B by means of bolts and nuts $a\ b$, so that the broom is clamped between the lower surface of B and the upper surface of C. To the under side of the head B are secured elbow-braces, D, (fig. 2,) which project downward from the ends of the head, and which serve to keep the corn firmly in position. But, if desired, they may be omitted, and the band E be laid around the upper bent portion of the corn, as is clearly shown in fig. 1. This band may be made of leather, cloth, India rubber, or of sheet metal, and prevents, as well as the arms D, the spreading of the corn beyond the outside of the bar C.

The stub ends of the corn, which are bent around the bar C, should reach down at least as far as to be in line with the bottom of said bar. They can then be tied by a string, F, which passes around the corn, and through holes or slots in the bar C, as is clearly shown in the drawing. The corn is thereby not only firmly held in position, but its lower ends can be spread just enough to make it appear and operate well.

Having thus described my invention, what I claim as new, and desire to secure by Letters Patent, is—

1. The manner of securing the corn or broom-material to the head, by clamping its stub ends between the bars B and C, and tying it by a string, F, and confining it in position by a band, E, or its equivalent, substantially as herein shown and described.

2. The broom-head, formed by combining the cross-head B, slotted or perforated bar C, bolts $a$, band E, or its equivalent, and spring F, with each other, substantially as and for the purpose set forth.

ALBERT ALDEN.

Witnesses:
BENJ. R. RAND,
ISAAC F. JONES.